July 7, 1936.  E. W. JOHNSON ET AL  2,046,560
TRACTOR
Filed Sept. 9, 1933  3 Sheets-Sheet 2
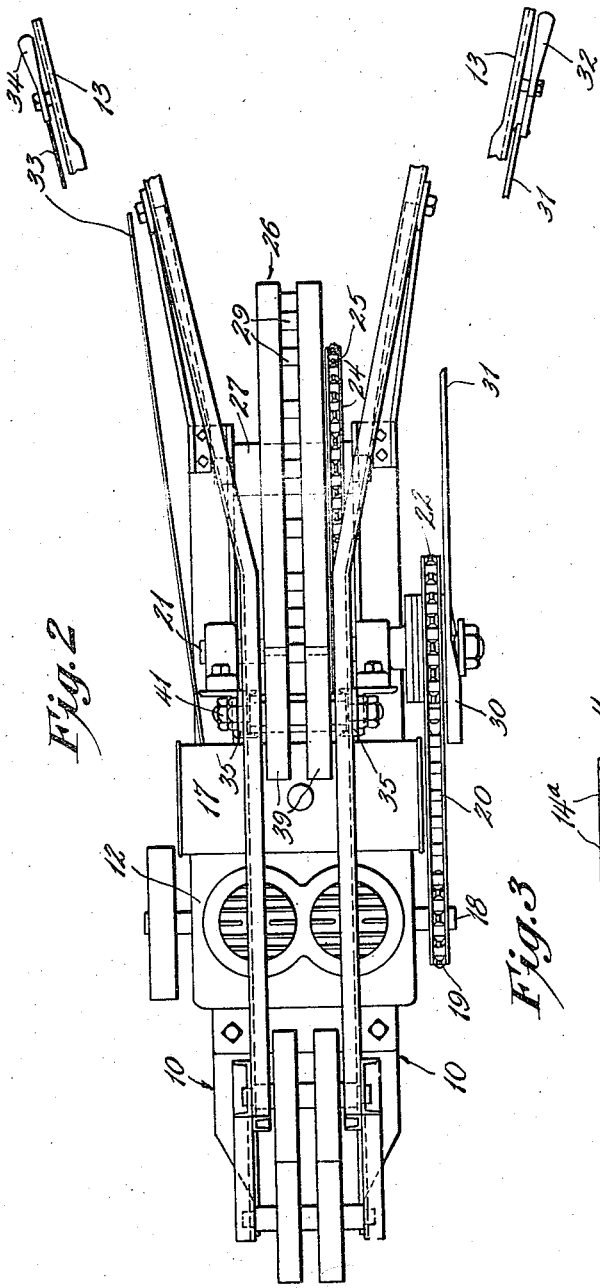
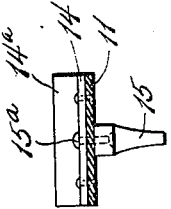
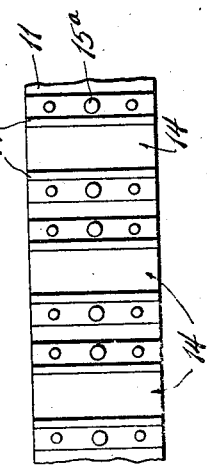
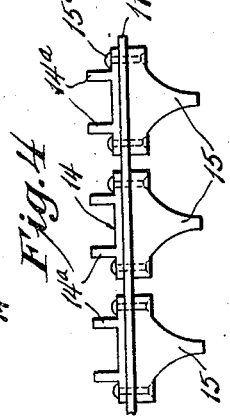
Inventors
E. W. Johnson
W. J. Buck
By Philip P. Siggers Attorney July 7, 1936.  E. W. JOHNSON ET AL  2,046,560
TRACTOR
Filed Sept. 9, 1933  3 Sheets-Sheet 3
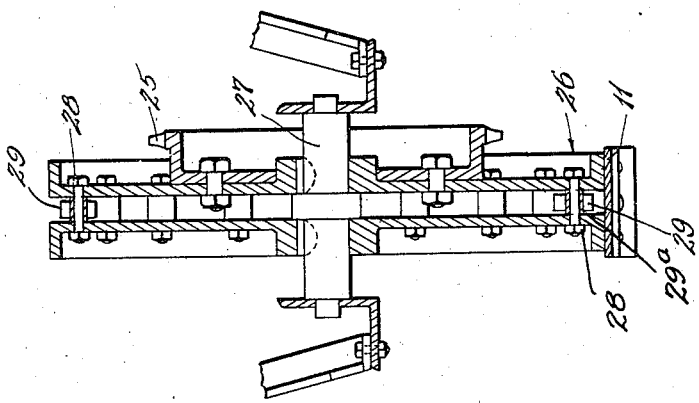
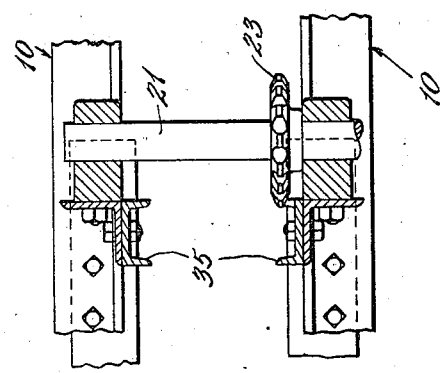
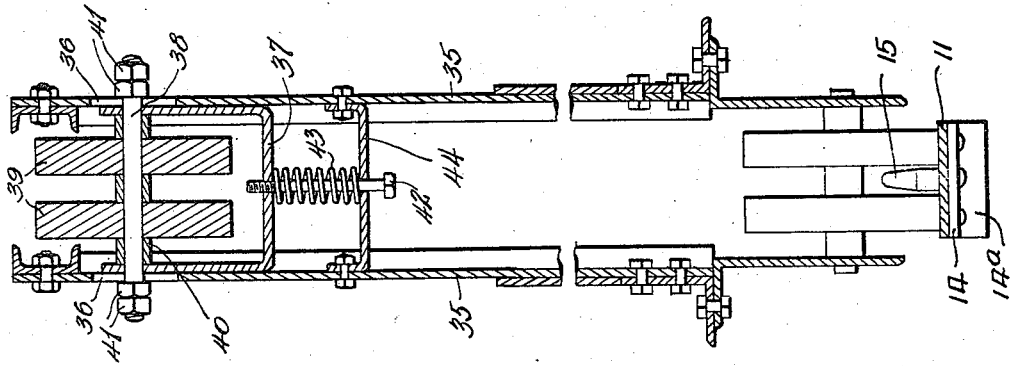
Inventors
E. W. Johnson
N. J. Buck
By Philip E. Liggu  Attorney Patented July 7, 1936

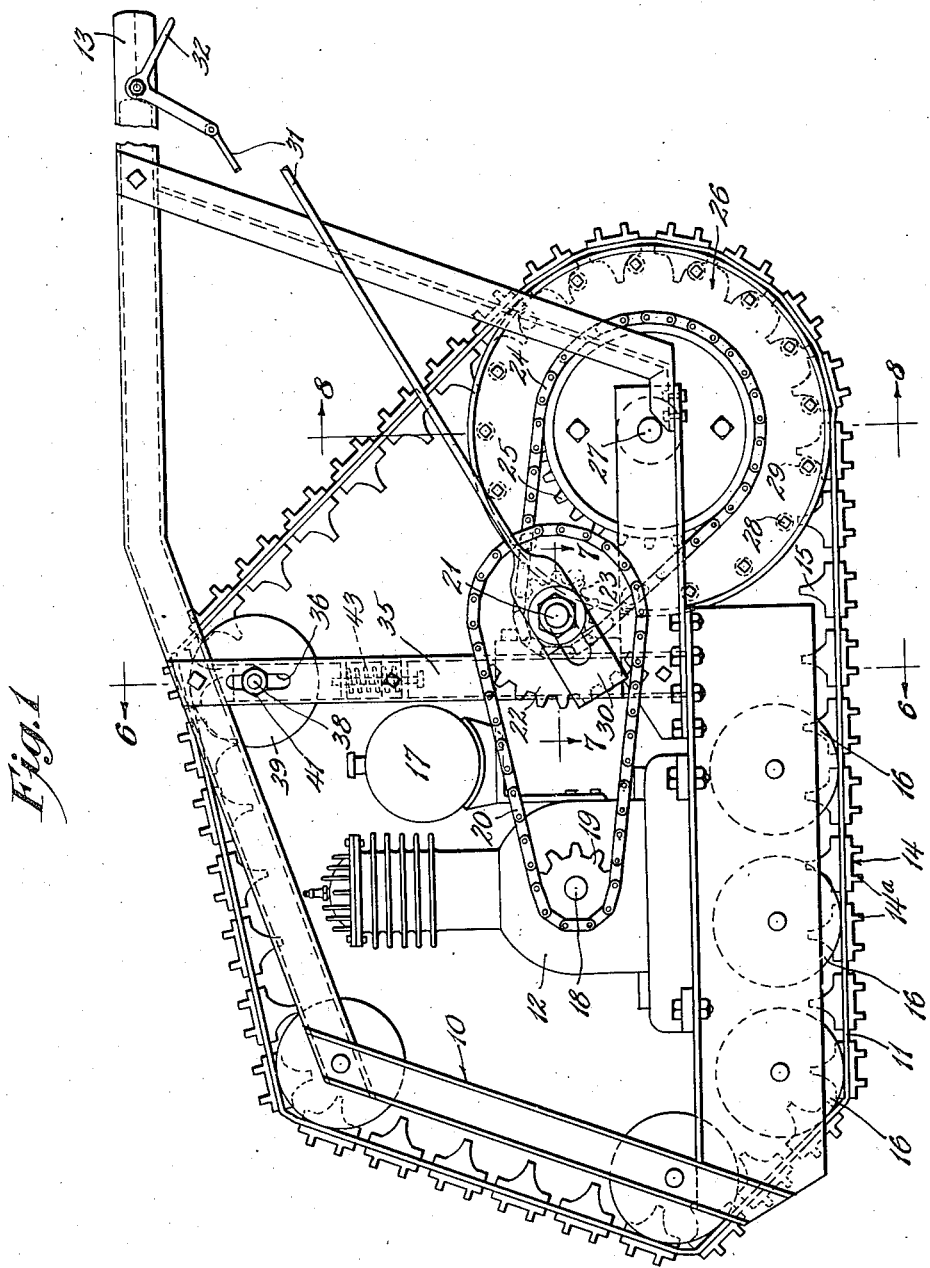

2,046,560

UNITED STATES PATENT OFFICE 2,046,560

TRACTOR

Elmo W. Johnson and Neafie J. Buck, Hicksville, N. Y.; Bessie L. Johnson executrix of said Elmo W. Johnson, deceased Application September 9, 1933, Serial No. 688,839

2 Claims. (Cl. 180—9.1)

This invention relates to tractors, and among other objects, aims to provide an improved tractor which may be guided and operated with ease by one attendant, who walks behind it; which has extremely high traction, so that it will traverse any kind of soil and will operate up the steepest banks or hillsides; which is very narrow transversely, so that it may run between two closely planted rows without injuring the foliage; which may either push or pull nearly all standard agricultural implements; which has ample power to do practically all the work of a heavy tractor, yet is easily transported from place to place and is economical to operate (being relatively light), and may be sold at such a low figure that it may be afforded by almost any truck gardener.

In the accompanying drawings showing a preferred embodiment of the invention,—

Fig. 1 is a side elevation of the tractor;

Fig. 2 is a top plan view;

Fig. 3 is a fragmentary plan of the endless belt;

Fig. 4 is a side elevation of the parts shown in Fig. 3;

Fig. 5 is an end elevation of the parts shown in Fig. 4;

Figs. 6, 7 and 8 are, respectively, enlarged sections on lines 6—6, 7—7 and 8—8 of Fig. 1.

Referring particularly to the drawings, there is shown a tractor comprising a frame 10, an endless belt 11 trained over pulleys so as to travel substantially around the perimeter of frame 10, a motor 12 mounted on the frame, mechanism (hereafter described) to drive the belt from the engine, and frame-attached handles 13 by which the tractor may be steered when traveling (such steering being effected by lifting the rear end and turning on the ground-bearing area of the forward end of belt 11).

The frame 10 is preferably made of inexpensive standard steel channels, angle bars and T-irons, and need not be specifically described, except to say that it is readily taken apart and reassembled when desired. Preferably the upper longitudinal frame member is extended rearwardly to form the handles 13, which diverge outwardly like plow handles, giving the operator perfect control over the tractor.

The endless belt 11 is made of heavy rubber belting, preferably about three inches wide, on the ouside surface of which a plurality of forged steel cleats or traction shoes 14 are secured. As shown in Figs. 3, 4 and 5, each cleat or traction shoe 14 has a pair of parallel fins 14a extending transversely of the belt and integral with the flat base 14b, which lies against the outer surface of the belt. To permit positive driving of the belt, a plurality of forged steel teeth 15 are secured to its inner surface, and for convenience in assembly, the same rivets 15a pass through each tooth 15 and through one of the cleats 14, the width of these parts being substantially the same so that equal spacing along the belt is possible. The small spaces between each pair of cleats and teeth permit flexing of the belt, which is necessary for guiding the belt as it moves in its endless path.

To support and guide the belt, preferably six or more idler wheels are employed, one of which is connected with a belt-tensioning mechanism to be described. Three of the idler wheels are in horizontal alinement, journaled at the bottom of the frame, and each such wheel, as shown in Fig. 6, comprises a pair of round disks 16 over whose peripheries the belt is trained. The disks 16 are spaced far enough apart to permit the teeth 15 to pass between them without contact (the teeth 15 being relatively narrow transversely of the belt, as shown in Fig. 5). Thus there is merely frictional contact between the belt and the idlers. A fourth idler, identical with the three bottom ones, is journaled at the extreme forward end of the frame, above and forward of the foremost bottom idler, and a fifth idler is above and to the rear of the fourth idler. Preferably the forward end of the frame has an angle of about 70° to the vertical to permit the fourth and fifth idlers to be journaled on the same members, and what is more important, to give a rearward slope to the front of the machine, so as to obviate as much as possible the catching and entangling of leaves, brush etc. in the moving parts. Further to minimize this undesirable result, the entire machine preferably is inclosed with removable side plates secured to the frame, which are not shown because they hide all the working parts except the belt.

Within the confines of the frame and rigidly mounted on the bottom frame members, is a power unit preferably in the form of a small air-cooled internal combustion engine. The engine 12 has a fuel tank 17 mounted thereon, although said tank may be at the top of the frame, between the handles 13. The main shaft 18 has a sprocket 19 driving a chain 20, in turn driving countershaft 21 by a sprocket 22. Countershaft 21 has a small sprocket 23 driving a chain 24, which is trained around sprocket 25, which, in turn, is secured to the belt driving wheel 26 so as to drive the same.

As shown in Figs. 2 and 8, the belt driving wheel 26 is composed of two circular, peripherally flanged disks keyed to a shaft 27 journaled in the frame. Roller bearings will be used in a commercial form, rather than the elementary bearings illustrated. The two disks are secured together near their peripheries by bolts 28 passing through fixed bushings 29ª which space the disks sufficiently far apart to permit the teeth 15 to pass between and engage the rotary bushings 29 which turn on said fixed bushings. As shown in Fig. 1, the bushings 29 are so spaced that each tooth 15 is engaged by the side of one bushing as it approaches the drive wheel, so that said wheel exerts a thrust simultaneously on a plurality of the teeth (eight teeth being shown in driving engagement, in the illustrative embodiment). Thus there is no great strain on the belt or on the connections between the cleats, teeth and belt, and the flow of power is smooth and easy. Also, the belt grips the peripheries of the flanges of the disks frictionally and derives some of its power because of such friction.

To control the movements of the tractor, a clutch 30 (whose construction forms no part of this invention) is on the countershaft and is governed by a rod 31 which extends upwardly to one of the handles 13, where it is pivotally connected with an operating lever 32 pivoted on said handle. The arrangement is such that the lever 32 is conveniently grasped when its supporting handle is gripped, and when so grasped, the clutch is engaged, and the belt-driving wheel 26 is connected with the engine. When the lever 32 is released, the clutch disengages automatically, and the tractor stops, although the engine continues running.

The engine is started by means of a rope wound about the fly-wheel or by a crank or lever (not shown). Its speed is controlled by a wire or rod 33 extending to the fuel intake and governed by a lever 34 on the other handle (see Fig. 2). A turn of lever 34 in one direction will speed up the motor, and a turn in the opposite direction will cause it to slow down. The operator will naturally speed up the motor before engaging the clutch with the other hand, and will decrease the speed of travel when making sharp turns; these maneuvers being accomplished with the greatest ease.

As the belt must be exposed, and as it will run over and through brush, stony ground, etc., sometimes sticks and stones will pass between the belt and one of the idlers or between the belt and the driving wheel. To prevent trouble when this occurs, a belt-tensioning device is provided which is best shown in Fig. 6. Rigidly secured to the frame intermediate the front and rear of the frame, and extending vertically, are two parallel channel bars 35 which have longitudinal, parallel slots 36 just below their upper ends. A U-shaped spring follower 37 is slidable in the channels of the channel bars and is perforated near its upper end to receive a shaft 38 on which an idler, (comprising a pair of disks 39) is mounted.

Shaft 38 extends through both slots 36. Bushings 40 serve to space the disks from each other and from the spring follower, and nuts 41 prevent longitudinal movement of shaft 38. At the lower end of the spring follower, a screw-threaded bore is provided for engagement with a tension-adjusting bolt 42. A strong coil spring 43 surrounds the bolt and bears at its upper end on the bottom of the spring follower and engages a fixed bar 44 with its lower end, said bar being secured to the channels 35. It will be clear that part of the weight of the belt, plus the weight of the idler and the U-shaped follower, are borne by spring 43. As the tension on the belt increases, the spring yields and the U-shaped follower momentarily descends, only to rise again when the tension decreases. Thus when a stick or stone gets under the belt, no harm is done and the belt soon clears itself as it travels around the idlers and wheels. In practice, this feature of the invention has been found to be of great importance.

Obviously, the present invention is not restricted to the particular embodiment thereof herein shown and described. Moreover, it is not indispensable that all the features of the invention be used conjointly, since they may be employed advantageously in various combinations and sub-combinations.

Having described one embodiment of the invention, what we claim as new and desire to secure by Letters Patent is:—

1. A tractor comprising, in combination, a frame; a relatively large driving wheel at the rear end of the frame; a plurality of idlers forwardly of the driving wheel and in horizontal alinement; other idlers journaled higher up on the frame; a narrow, endless, flexible belt having a multiplicity of traction cleats on its outer surface, said belt being trained around said idlers and wheel and substantially enclosing said frame; co-operating means on the wheel and belt for positive driving engagement of said belt and wheel; a vertically acting belt tensioner on the frame and supporting intermediately the upper length of the belt; power-actuated means on the frame for driving the driving wheel; and handles extending from the rear of the frame to guide the tractor.

2. A tractor comprising in combination, a frame; wheels on the frame including a driving wheel and a number of idlers; an endless belt trained around the driving wheel and idlers; an engine mounted on the frame and having driving engagement with the driving wheel; said belt having a plurality of equally spaced teeth projecting inwardly from the inside surface thereof substantially at right angles to said surface; said driving wheel comprising two spaced disks, each disk having a peripheral flange; said idlers being in pairs spaced apart just far enough to pass said teeth; the inside surface of said belt having frictional engagement with the peripheries of said peripheral flanges and of said idlers; means securing the disks together and other means spacing them uniformly apart; and rotatable members located between said disks near the peripheries thereof and adapted to engage with the aforesaid inwardly projecting teeth on the belt, so that the driving wheel has positive driving engagement with the belt as well as frictional contact therewith over a large area.

ELMO W. JOHNSON.
NEAFIE J. BUCK.